United States Patent [19]
Pelabon

[11] 3,993,464
[45] Nov. 23, 1976

[54] AIR FILTER
[75] Inventor: André E. Pelabon, Paris, France
[73] Assignee: ANF Frangeco S.A., Paris, France
[22] Filed: Jan. 23, 1975
[21] Appl. No.: 543,463

Related U.S. Application Data
[63] Continuation of Ser. No. 350,813, April 13, 1973, abandoned.

[52] U.S. Cl. .................. 55/480; 55/481; 55/484; 55/493; 55/503; 55/504; 248/316 R
[51] Int. Cl.² .................................. B01D 46/10
[58] Field of Search ............ 55/422, 475, 478, 480, 55/481, 482, 483, 484, 493, 495, 496, 501, 503, 504, 508, 509, 511, 517, 519, 306, DIG. 12, DIG. 31, 479; 248/316 R

[56] References Cited
UNITED STATES PATENTS

| | | | |
|---|---|---|---|
| 1,900,476 | 3/1933 | Wittemeier | 55/484 |
| 2,575,499 | 11/1951 | Manow | 55/422 |
| 2,729,302 | 1/1950 | True | 55/481 |
| 2,857,017 | 10/1958 | Nutting | 55/509 |
| 3,246,456 | 4/1966 | Sharp | 55/481 |
| 3,630,008 | 12/1971 | Revell | 55/493 |

Primary Examiner—Frank W. Lutter
Assistant Examiner—David L. Lacey
Attorney, Agent, or Firm—George H. Mitchell, Jr.

[57] ABSTRACT

An air filter system for an internal combustion engine comprises a caisson which contains a series of superposed compartments containing horizontal, removable filter elements, each of which elements is supported on a wedge-shaped slide which, in turn, is supported on an inclined wall which allows the slide and filter element to be removed from the inlet side of the caisson for replacement of the filter elements. The inclined walls are alternated with horizontal walls, the latter being provided with openings into which the filter elements are inserted, and the entire series of superposed compartments can be formed from a single sheet of metal bent into a zig-zag configuration.

7 Claims, 3 Drawing Figures

AIR FILTER

CROSS REFERENCES TO RELATED INFORMATION AND REFERENCES

This application is a continuation of my copending application Ser. No. 350,813, filed Apr. 13, 1973, now abandoned.

This application for patent is copending with at least the following related applications concurrently filed herewith by the same inventor: Ser. No. 350,811 now U.S. Pat. No. 3,862,604, for Engine Compartment and Ser. No. 350,812 now U.S. Pat. No. 3,850,229, for Air Intake System.

BRIEF SUMMARY OF THE INVENTION

The invention relates to the securing or anchoring of filtering elements in an air-filter plenum, duct frame or caisson frame; more particularly the invention relates to and is directed toward means for achieving a fixation or securing of filtering elements readily removable for cleaning and inspection.

FIELD OF THE INVENTION

Usually in a filter duct frame, the anchoring of filtering elements is achieved by means of an open articulated clamp hinged on either side of the back part of a filter-holding frame. The front part of the frame is blocked by a bolt.

To disassemble a filter element on the basis of this arrangement, the procedure is as follows:

In an initial stage, release the bolt on the front part of the frame, and then the back part of the frame. The back part of the frame is released by raising it so as to allow the articulated clamp to be removed from the frame, this operation being performed by an operator in front of the caisson or duct frame; the filtering element is then removed by sliding it along the frame of the duct work.

A drawback of the difficulties involved in lifting the frame is that the filter becomes damaged as does the hermetic sealing joint formed by the filtering product contained in the anchoring frames and the framework of the duct.

The filtration of air is no longer as efficient; impurities can become introduced into the engine, as well as particles of filtering products arising from damage caused to the filters when they are being disassembled.

BACKGROUND OF THE INVENTION

It is an object and purpose of the invention to achieve a novel mounting and supporting structure for the filtering elements that the filtering elements are free from the drawbacks described above.

To this end, the filtering element frames are placed on wedged-shaped slides; the latter are supported by the frame of the filter caisson or duct. A telescopic attachment, located in the front part of the frame containing the filtering product, enables the filter elements to be held in place.

It is a further and additional object of the invention herein to provide for the anchoring of filtering elements in an air filter duct frame using filtering elements by assembly of the filtering elements on wedge-shaped slides enabling the disassembling or removing of filtering elements without damage either to the filtering material or to the hermetic joint formed by the filter and the duct framework.

It is a further object and feature of an invention in an anchoring of filtering elements in an air filter duct frame using these filtering elements to provide for a filter duct frame having an inclined frame structure, a wedged shaped slide being wedged shaped in a dimension generally transverse to the plane of the inclined frame structure means and being shaped and arranged to be received within the filter duct frame for sliding along said inclined structure, the wedged shaped slide having a filtering tray being received in abutment along its upper surface elements, a plate projection near the large end of the wedge shaped slide with an aperture therein, a support base secured to the inclined frame for mounting a spring-biased clamp means for engaging with the aperture of the plate projection.

A further feature of the invention is to provide a boss disposed along an outer surface of said inclined frame for limiting the outer movement of the wedged-shaped slide.

It is a further advantage of the invention to provide spring-biased clamp means for removal from engagement with an aperture of a plate projection for insertion, inspection and removal of the filter tray from tight secure and essentially hermetic seal engagement in a frame of a duct.

A further object of the invention is to provide in an inclined frame structure, means so that a filter duct tray may be inserted into, replaced and inspected when the wedged shaped slide means is in an extended or removed position in relation to the inclined frame structure means.

An additional object and advantage of the invention is to provide a stacked series of said inclined frame structure means, said wedged shaped slide means and said filtering means.

An added feature and object of the invention is to provide a frame structure made from a single sheet bent into zig-zag shaped surfaces for supporting a plurality of said filtering means.

It is a further object of the invention to provide means to insert, use and remove for inspection or replacement the filtering element frames of the invention and to provide such a construction so that there results no loss of a hermetic sealing joint formed by the filtering product or structure contained in the anchoring and supporting frames and the framework of the duct.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT

Figure 1:
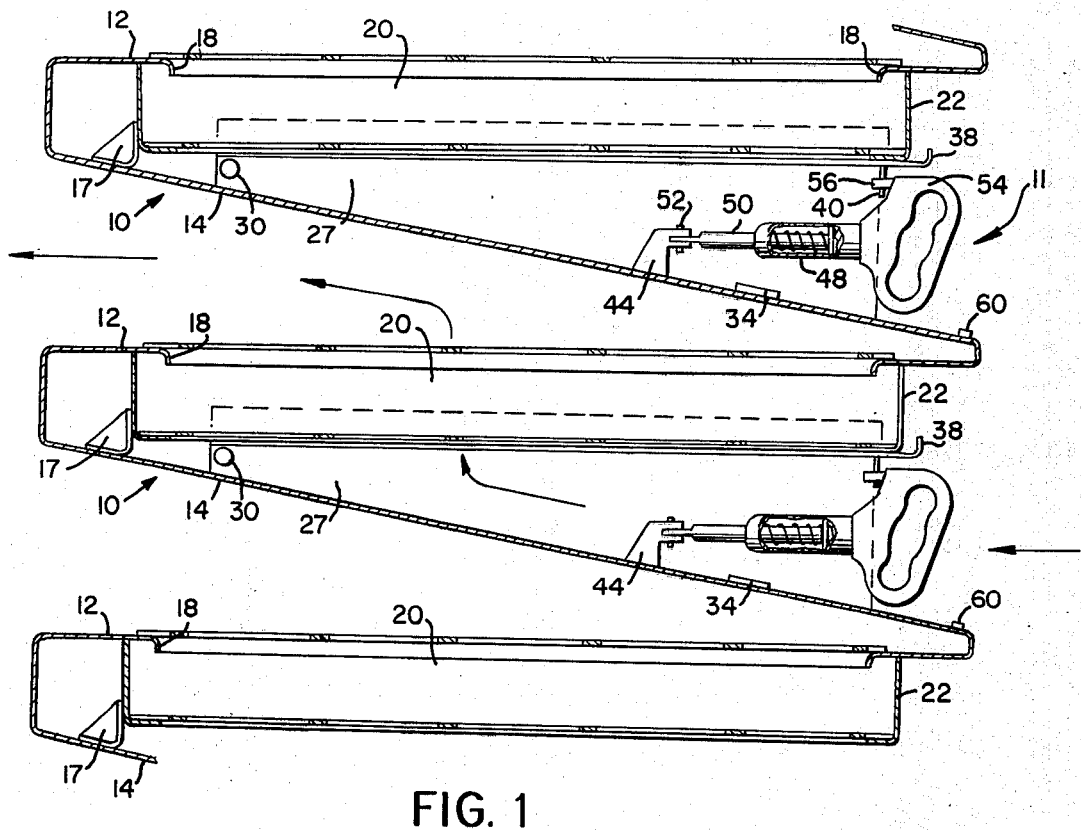
FIG. 1 is a vertical cross-section of a portion of an air filter caisson frame showing two superposed compartments containing removable filter trays supported on removable, wedge-shaped slides, and including portions of the adjacent compartments above and below the first two compartments.
Figure 2:
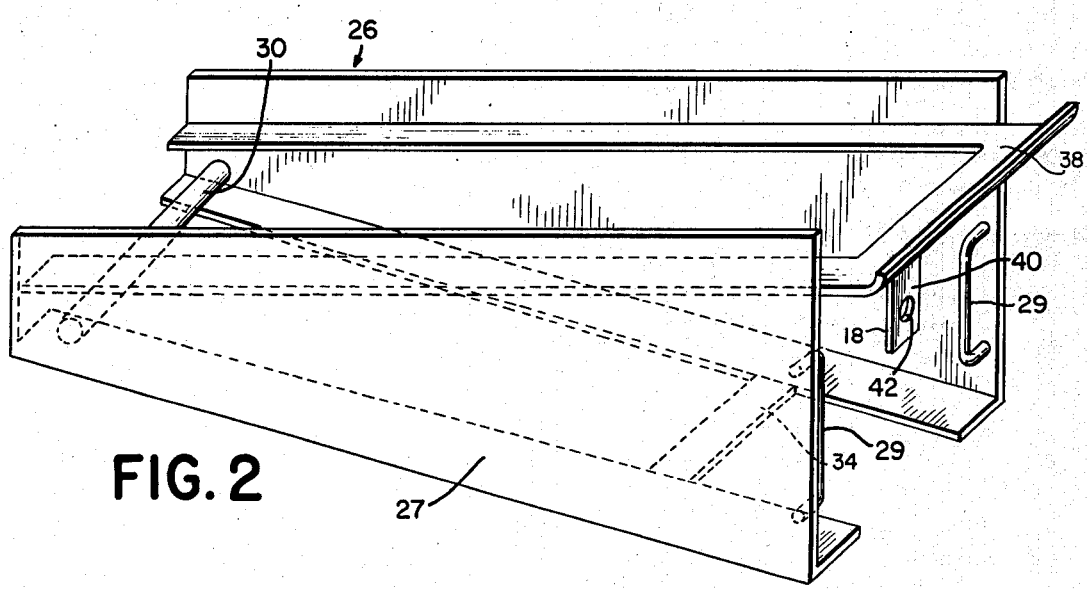
FIG. 2 shows a side perspective view of the wedged-shaped slide means shown as a part of FIG. 1.

Referring now to the drawings, there is shown a portion of a filter arrangement or filter duct frame 10 which comprises one of a plurality of similar wedge-shaped compartments arranged in superposed relationship in a caisson as indicated schematically in the aforementioned U.S. Pat. Nos. 3,862,604 and 3,850,229. Several of these compartments are shown in FIG. 1, with only a portion of the uppermost and lowermost compartments being included an inclined frame structure means 14, and a generally horizontal filter-engaging frame structure 12. The structure means 12 and 14 may be constructed and arranged so as to be made from a continuous sheet of metal manufactured into a zig-zag construction.

There is provided upon the under surfaces of said horizontal frame structure 12, a flanged-projection 18 forming a continuous lip for engaging with a filter product or filter element 20 disposed within a filter product frame on perforated tray 22.

When the filter tray 22 is sought to be inserted, inspected or replaced, it is passed through the opening or mouth portion 11 of the zig-zag construction formed by the frame structure means 12, 14.

The filter tray 22 is inserted in place against a rear stop 17 with its upper surface engaging with the flanged projection 18 which defines a rectangular opening in frame structure 12 and then a wedged-shaped slide 26 is moved upwardly along the inclined frame structure means 14 so that the filter tray is secured in place by the wedged-shaped slide 26. The wedged-shaped slide 26 has two side pieces 27 and a connecting cross-bar 30 spacing the side pieces apart at one end, and spacer bar 34 at the distal portion from the cross bar 30.

Projecting inwardly from the sides 27 and below their upper margins is a U-shaped flat plate 38 for engaging the bottom of the filter tray 22 and having an inwardly and downwardly bent projection 40 in which there is an aperture 42.

Along the inclined frame means 14 there is a support base 44 secured onto it and from which is pivotally secured and attached a clamp 48 having an inwardly disposed spring biased rod 50 connected by pin 52 to the support base 44. The clamp 48 is provided with a handle 54 on the upper portion of which is an inwardly extending projection 56 for being received in mating relation with the aperture 42 of the plate projection 40.

The lower or mouth end of the inclined frame means 14 may have an abutment or boss 60 for limiting or restraining further outward movement of the wedged-shaped slide 26 when the spacer bar 34 engages with the boss 60.

The support base 44 is held in place by bolts, welding or other conventional securing means.

One or more of the spring-biased clamp assemblies, made up of elements 45-56 may be provided to secure the ends of the wedged shaped slide 26 into essentially tight and secure engagement with the filter tray 22 as the filter product 20 engages with the lips or projection 18.

This handle or handles 54 may be turned at a sufficient angle in one direction or another so as to avoid hindering the movement of removing the wedged-shaped slide 26.

In operation of the components forming the invention, the handles 29 of the wedged-shaped slide 26 are then grasped and pulled so as to remove the pin 56 from the aperture 42 so that the slide 26 may be moved downwardly through the mouth until the spacer bar 34 comes into contact with the boss 60 fixed onto the inclined frame means 14 thereby limiting the movement of the slide 26.

Handles 29 also allow for handling or holding the slide 26 on its insertion into or its removal from the received position.

The sliding of the wedged-shaped slide 26 along the slope of the inclined frame means 14 triggers the vertical drop of the filter tray 22 containing the filtering product 20, thereby releasing without deformation the filtering product and the waterproof or water-tight and hermetically tight seal or joint formed by the filtering product and the filter tray. The remaining step is the ready withdrawal of the filter tray 22 containing the filtering product 20.

The operation of returning, replacing or restoring the tray 22 to its place is carried out in the inverse order of the disassembly above described.

Figure 3:
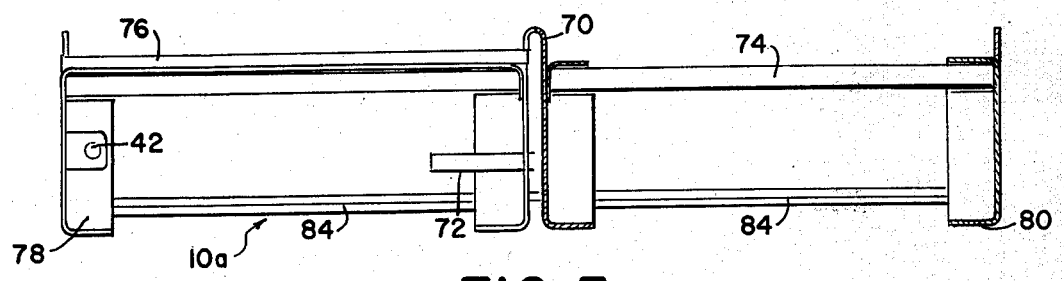
FIG. 3 shows a modification in which two wedged-shaped slides are joined by a common supporting member 70 in side-by-side arrangement, the left-hand portion of the drawing being a front elevation of one slide, the right-hand portion showing the other slide in vertical section.

The double filtering element embodying a modification in slide construction makes it possible to accommodate side-by-side two supporting frames for the filtering product and is shown in FIG. 3.

FIG. 3 shows, as a non-restrictive example, one means of bringing about this juxtaposition of the frames supporting the filtering tray 22 and the slide 26. The wedge-shaped slide 26 remains the same as for a single slide described above; the central wedge-shaped part 70 comprises a single reentrantly folded sheet as shown, and is shown equipped with a handle 72 that makes it possible to obtain the juxtaposition of the filtering product trays (not shown).

A crosspiece 74 connects to the back part the various side elements constituting the slide 26; as for the upper part, an extension 76 provides for maintaining a distance between projection 78, 80 and 70.

The slide 26 is held in place in the filter assembly 10a by means of two telescopically spring-biased clamps (not shown) located on either side of the forward part of the slide, each having an alignment pin (not shown) which fits into the aperture 42 described above. Spacer bars 84, 84 fixed to the lower front part of the slides limit the movement of the slide in the filter frame, as in the case of the single slide.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. In air filter supports of the type wherein a rectangular caisson is subdivided into a plurality of superposed pairs of similar compartments, each of said compartments being wedge-shaped, the apex of each wedge being closed, the peripheral margins of the base of each wedge defining a vertical, rectangular opening of substantially greater area than said closed end, the two compartments of each pair being oppositely disposed with respect to each other, whereby the open end of one compartment of each pair is disposed on one side of the caisson to define an air inlet and the open end of the other compartment of each pair defines an air outlet disposed on the opposite side of the caisson, the two compartments of each pair being separated by a common horizontal wall having an opening therein, a perforated air filter tray removably positioned beneath said opening through which air passes from said air inlet to said air outlet, the top of the upper compartment and the bottom of the lower compartment being defined by respective parallel, inclined, imperforate walls, a wedge-shaped slide means removably received in said one compartment for supporting said air filter tray in horizontal, operative position in said opening in said common wall, said slide means being slidable on the inclined wall of the lower compartment in one direction for placing said filter tray in said operative position and being movable in the opposite direction to remove the filter tray from said one compartment.

2. The invention defined in claim 1, wherein said air filter support includes releasable latching means for holding said slide means in said one compartment.

3. The inventiohn defined in claim 2, wherein said latching means includes two disengageable coacting elements, one of said two elements being secured to said slide means, the other of said two elements being secured to one of said compartments, one of said two elements including resilient means for urging the slide means in said one direction and being yieldable in the other direction for disengagement of the two elements.

4. The invention defined in claim 2, wherein said one compartment includes stop means limiting slidable movement of the slide means in said opposite direction.

5. The invention defined in claim 1, wherein said slide means comprises a pair of horizontally spaced members including means for supporting said members in said spaced relationship, said members being slidably supported on said inclined wall of the lower compartment and including means engageable with the underside of said filter tray to support the tray in said operative position.

6. The invention defined in claim 5, wherein said means to support said filter tray comprises a horizontal surface secured to each of said spaced members.

7. The invention defined in claim 5, wherein said slide means also includes a third member disposed in parallel relationship between said pair of members, said third member comprising a vertically disposed reentrantly curved plate having a vertical profile similar to that of said pair of members, the respective free margins thereof disposed at the bottom of the third member and being provided with outwardly projecting flanges for slidable engagement with said inclined wall.

* * * * *